United States Patent [19]

Parulski

[11] Patent Number: 5,523,786
[45] Date of Patent: Jun. 4, 1996

[54] COLOR SEQUENTIAL CAMERA IN WHICH CHROMINANCE COMPONENTS ARE CAPTURED AT A LOWER TEMPORAL RATE THAN LUMINANCE COMPONENTS

[75] Inventor: Kenneth A. Parulski, Rochester, N.Y.

[73] Assignee: Eastman Kodak Company, Rochester, N.Y.

[21] Appl. No.: 171,731

[22] Filed: Dec. 22, 1993

[51] Int. Cl.⁶ .............................. H04N 9/07; H04N 5/225
[52] U.S. Cl. ............................ 348/269; 348/70; 348/237; 348/221; 348/364
[58] Field of Search ........................... 348/65, 68, 70, 348/71, 234, 237, 268, 269, 272, 757, 780, 221, 362, 363, 364, 224, 229; 128/6; H04N 5/225, 9/04, 9/07

[56] References Cited

U.S. PATENT DOCUMENTS

| | | | |
|---|---|---|---|
| 4,074,306 | 2/1978 | Kakinuma et al. | 358/1 |
| 4,253,447 | 3/1981 | Moore et al. | 128/6 |
| 4,339,771 | 7/1982 | Morishita et al. | 348/237 |
| 4,404,585 | 9/1983 | Hjortzberg | 358/41 |
| 4,646,166 | 2/1987 | Arlan | 358/310 |
| 4,685,451 | 8/1987 | Ando | 128/6 |
| 4,713,683 | 12/1987 | Fujimori et al. | 358/42 |
| 4,721,998 | 1/1988 | Glenn | 348/234 |
| 4,750,041 | 6/1988 | Vogel et al. | 348/221 |
| 4,845,553 | 7/1989 | Konomura et al. | 358/98 |
| 4,875,091 | 10/1989 | Yamada et al. | 358/42 |
| 5,081,524 | 1/1992 | Tsuruoka et al. | 358/32 |
| 5,187,569 | 2/1993 | Tani | 358/50 |
| 5,202,692 | 4/1993 | Huguenin et al. | 342/179 |

*Primary Examiner*—Safet Metjahic
*Assistant Examiner*—Cheryl Cohen
*Attorney, Agent, or Firm*—David M. Woods

[57] ABSTRACT

A color sequential electronic camera includes an RGB light source in which the R and G sources are activated in combination to provide a luminance light beam, and the R and B sources separately to provide separate chrominance light beams. Image light reflected by a subject is captured by an image sensor, which generates a color sequential signal comprising a sequence of luminance and chrominance image components. By activating the light sources such that chrominance light beams alternate between luminance light beams, the chrominance image components are captured at a lower temporal rate than the luminance image components. Furthermore, by binning the sensor photosites together for the chrominance image, the chrominance components are captured at a lower spatial resolution than the luminance image components.

41 Claims, 10 Drawing Sheets

COLOR SEQUENTIAL CAMERA IN WHICH CHROMINANCE COMPONENTS ARE CAPTURED AT A LOWER TEMPORAL RATE THAN LUMINANCE COMPONENTS

FIELD OF INVENTION

This invention relates to electronic cameras using solid state image sensors, and, in particular to color sequential electronic cameras.

BACKGROUND OF THE INVENTION

In some applications, such as medical imaging, a low power color sequential camera head, using a monochrome sensor, provides a digital output signal over a low bit rate digital link to a remote base unit. A typical application is an endoscope for examining body cavities, wherein the camera head is at the end of a probe, and the base unit includes a monitor for viewing images captured by the camera head. The camera head sequentially illuminates the scene with red, green, and blue light, and then sequentially digitizes the red, green, and blue color images output from the monochrome sensor. In addition, to minimize power, the pixel rate of the digital output signal should be as low as possible, while still maintaining good image resolution and good motion portrayal. Ordinarily, the RGB images all use the full sensor resolution. The monochrome sensor is read out in an interlaced mode at 60 fields per second, so that there are 20 red, 20 green, and 20 blue fields per second.

A known type of field sequential color television system, for use in a known type of endoscope, is shown in U.S. Pat. No. 4,845,553. The light of three primary colors (red, green, and blue) is sequentially irradiated onto an object such as an organism, and the reflected light of each of the individual colors is received by a charge-coupled device (CCD), where it is converted into an electrical image signal. After the thus-obtained picture signals are stored in memories in succession, they are converted into color television signals by a processor and displayed on a color monitor. In particular, as shown in the '553 patent, the memory capacity is reduced by sub-sampling the full resolution output of the CCD for the red and blue light, while maintaining the green light at its full resolution output.

In U.S. Pat. No. 4,685,451, red and blue light is similarly sub-sampled, but within the same timing. This is done by utilizing a single sensor having cyan and yellow color filters. Full resolution green is obtained for odd fields by illuminating the sensor with green light (cyan and yellow photosites both being sensitive to green light), and red and blue are obtained at lesser resolution for even fields by illuminating the sensor with white (or magenta) light (cyan and yellow photosites being separately sensitive to blue and red light, respectively). The light may be input into the endoscope sheath by means of fibers, or, as described in U.S. Pat. No. 4,074,306, a package enclosing a plurality of solid state light emitting chips can be mounted in the sheath of the endoscope.

In the known systems as described, including ones that use sub-sampling to reduce resolution and storage, the pixel data rate nonetheless must be maintained at relatively high rates, such as 12 MHz or thereabouts. Moreover, subsampling can reduce image quality by introducing color aliasing artifacts. To provide an improved camera, what is needed is a lower pixel rate, to decrease power consumption, yet a higher field rate, to improve motion rendition—without producing color artifacts.

SUMMARY OF THE INVENTION

Since the human visual system is more sensitive to luminance wavelengths than to chrominance wavelengths, an object of the invention is to improve motion rendition with an electronic camera that is more sensitive to luminance temporal resolution than to chrominance temporal resolution.

A further object of the invention is to utilize the lower chrominance resolution to provide an electronic camera with a lower pixel rate.

A further object of the invention is to increase the signal level of dimly illuminated objects by decreasing the temporal update rate, so as to increase the exposure time, and by increasing the binning factor, so as to sum more pixels together.

Accordingly, the invention provides for an electronic color sequential camera including a plurality of light sources arranged to sequentially illuminate a subject; means for activating a) two or more of said light sources to generate a luminance light beam and b) selected ones of said light sources to generate at least first and second chrominance light beams, the luminance and chrominance light beams being generated in a predetermined sequence; and an image sensor arranged to receive the luminance and chrominance light beams reflected from the subject and to generate therefrom a color sequential signal comprising a sequence of luminance and chrominance image components, whereby the camera is more sensitive to luminance temporal resolution than to chrominance temporal resolution.

As further detailed, the invention includes the emission of a sequence of luminance light beams separated by an alternating sequence of either first or second chrominance light beams. The image sensor then generates a color sequential signal comprising a sequence of luminance image components separated by an alternating sequence of chrominance image components, whereby the chrominance image components are captured at a lower temporal rate than the luminance image components, and the pixel rate is consequently lowered.

Furthermore, the image sensor may comprise an array of photosites arranged in rows and columns, such that the luminance image component is obtained from substantially all the photosites and the chrominance image components are obtained by binning together selected rows and/or columns of photosites to produce a lesser number of pixel values, whereby the chrominance image components are captured at a lower spatial resolution than the luminance image components, and the pixel rate is further lowered. Furthermore, the binning operation increases the signal level of the chrominance components, which allows lower power light sources to be used, thus further reducing the power.

The advantage of the invention, as heretofore described, is that luminance emissions are customized to the human visual system, while reduced chrominance resolution is appropriate, since the human visual system is more sensitive to luminance spatial resolution than to chrominance spatial resolution. This results in an electronic color sequential camera with better temporal resolution, and therefore better motion portrayal, with fewer colored edge artifacts and with a lower camera head data rate.

DESCRIPTION OF THE PREFERRED EMBODIMENTS

The invention is based in part on the recognition that it is possible to turn on more than one color emitter during the sensor illumination period. This allows the camera to capture luminance frames, which are ordinarily defined as the weighted sum of red, green, and blue light. For television cameras capturing normal pictorial scenes, luminance is typically composed of approximately 60% green, 30% red, and 10% blue light. For medical applications inside body cavities, however, other weightings of red, green and blue may provide better images, because the reflectance of typical objects is higher for red and lower for blue, relative to normal pictorial scenes. Therefore, the combination of red and green light is used to provide luminance in practice of the invention. Two other color sequential frames are used to provide chrominance resolution, by illuminating only one color emitter per frame integration time, for example red or blue. Psychophysical studies have shown that not only is luminance spatial resolution more visually important than chrominance spatial resolution, but luminance temporal resolution is also more visually important than chrominance temporal resolution. Therefore, for a given pixel data rate, the perceived temporal resolution is increased and image quality can be optimized by using luminance frames instead of green frames. Furthermore, by reducing the spatial resolution as well as the number of the red and blue frames, relative to the luminance frames, the camera head output data rate can be decreased while providing improved image quality.

Figure 1:
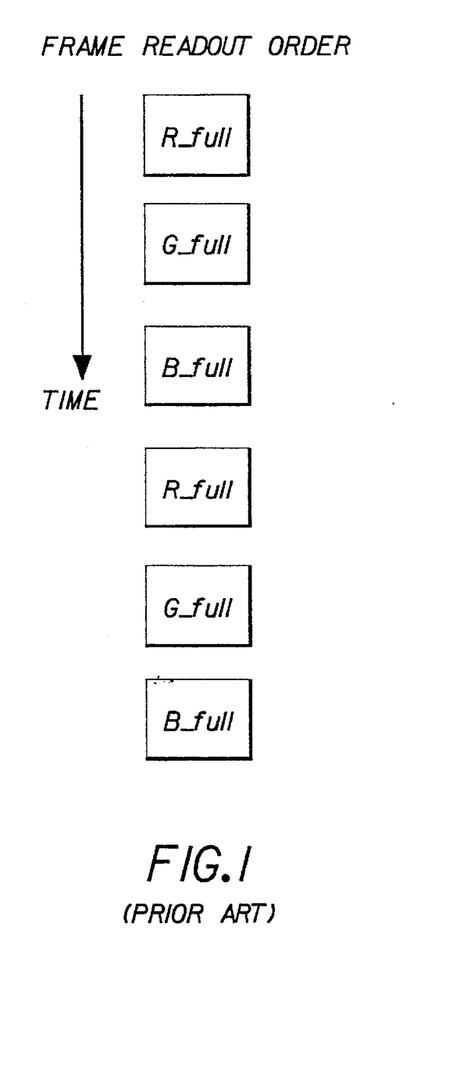
FIG. 1 shows the temporal frame readout order and spatial resolution for a prior art system.
Figure 2:
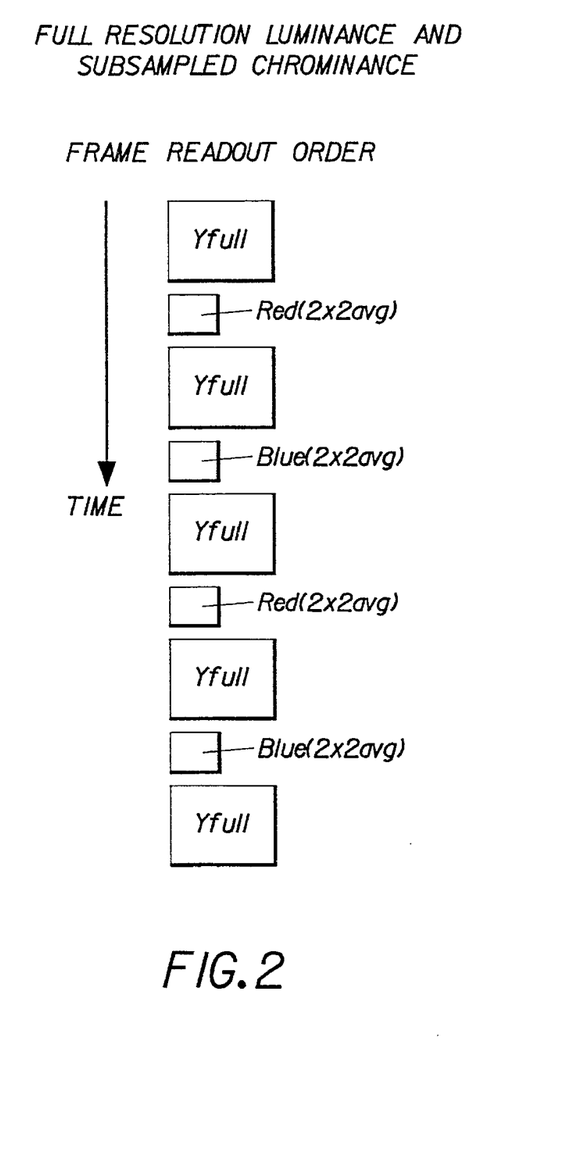
FIG. 2 shows the temporal frame readout order and spatial resolution for a system according to the invention.

A simplified diagram of the difference between the present invention and the prior art is shown in FIGS. 1 and 2. In the prior art, shown in FIG. 1, the resolution and number of red, green, and blue frames (or alternately red, green, and blue fields, for interlaced video formats) is equal. The temporal frame readout sequence of the invention, shown in FIG. 2, indicates that there are twice as many luminance frames as red or blue frames. Furthermore, the luminance frames have higher spatial resolution (×2 more lines and ×2 more pixels per line) compared to the red or blue frames.

Figure 3:
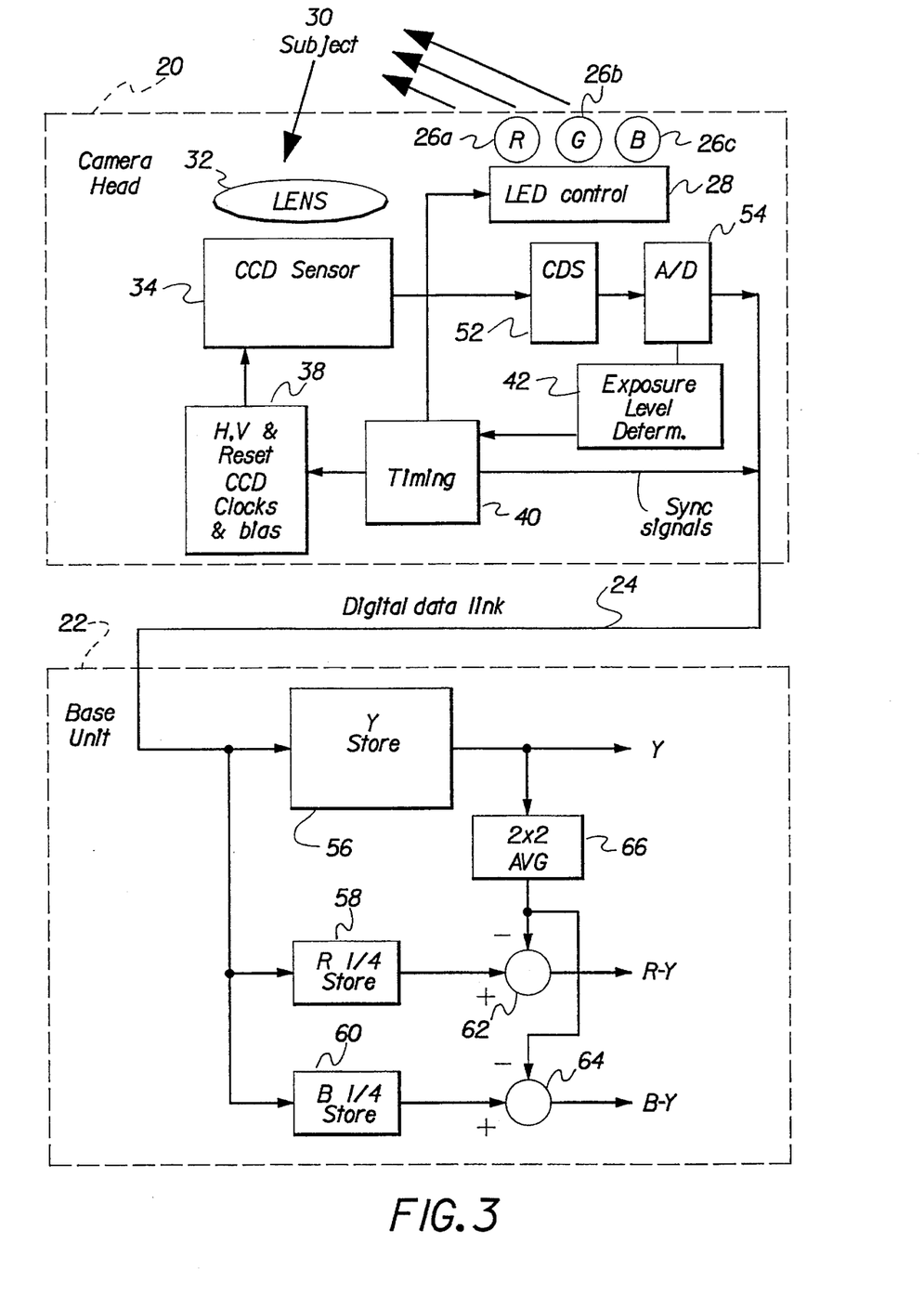
FIG. 3 shows a block diagram of a camera head and a base unit according to the invention.

A block diagram of an electronic color sequential camera according to the invention is shown in FIG. 3 in the form of a camera head 20 connected to a base unit 22 by a digital data link 24. Although this invention is not limited to a specific application, a color sequential camera head 20 of the type described herein may be used in a medical application in the elongated insertion portion of an endoscope. The insertion portion (not shown as such, but which includes the digital data link 24) is inserted into a body cavity of an organism, and the camera head 20 generates images that are transmitted back to the base unit 22 for observation by an attending physician (on a monitor, not shown).

Figure 4:
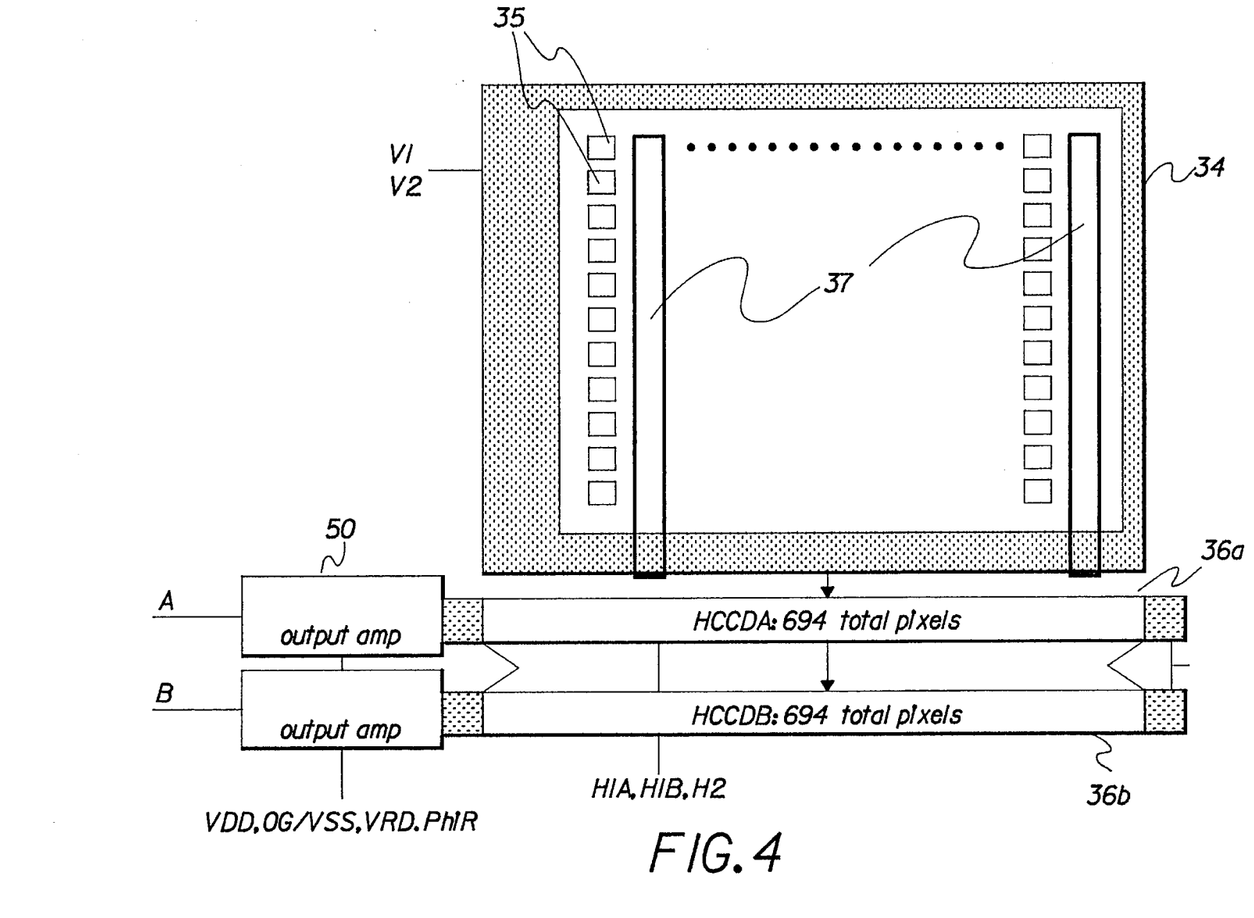
FIG. 4 is a diagram of the image sensor used in the camera head shown in FIG. 3.

In the camera head 20, red, green, and blue light emitting devices (LEDs) 26a, 26b, 26c are activated by an LED control device 28 to emit red, green, and blue light beams outward from the camera head 20 toward a subject 30. The subject 30, being in a confined space, is illuminated only by the red, green and blue light beams. Red, green and blue light reflected from the subject 30 is then collected by a lens 32 and directed to an image sensor 34. An exemplary sensor useful with the invention is the Kodak KAI-310 CCD image sensor shown in FIG. 4. This sensor is an interline transfer CCD device having photodiodes 35 connected to vertical readout registers 37 (shown in part in FIG. 4). The CCD has a progressive scan (non-interlaced) architecture, such that every pixel is transferred into the vertical registers 37 during each frame readout time. This sensor has 484 active lines and 648 active photosites per line, and a pair of read out registers 36a, 36b. In this embodiment, only readout register 36a is used, to provide a single register video output signal, although the CCD is capable of providing dual output signals. The CCD contains additional black (light-shielded) photosites vertically and horizontally, so that a total of 496 vertical clock cycles, with 694 horizontal clocks per vertical cycle, are used to transfer each image frame.

In accordance with the invention, the luminance light beam is generated by activating both the red and green emitting devices 26a and 26b during the sensor integration period for the luminance image component. Then the red and blue emitting devices 26a and 26c are activated sequentially to generate red and blue chrominance light beams during the sensor integration period for the chrominance image components. Note that by turning on both red and green LEDs, the signal level of the luminance image component is substantially increased, so that the signal-to-noise ratio is improved. The blue LED 26b is not turned on for the luminance image component to reduce the power consumption since the efficiency of available blue LEDs is poor.

Figure 5:
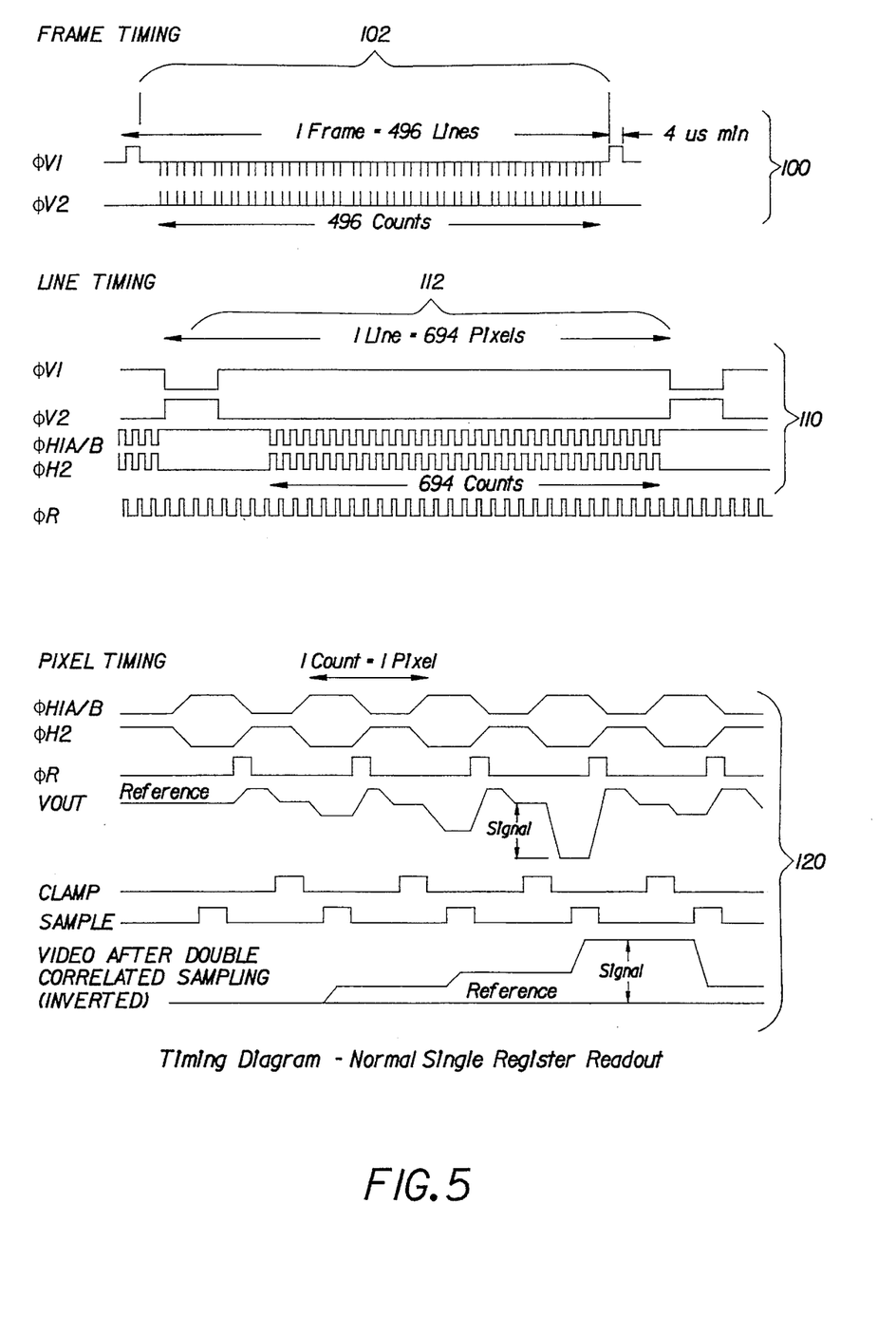
FIG. 5 shows timing waveforms for "normal" operation of the sensor shown in FIG. 4.
Figure 6:
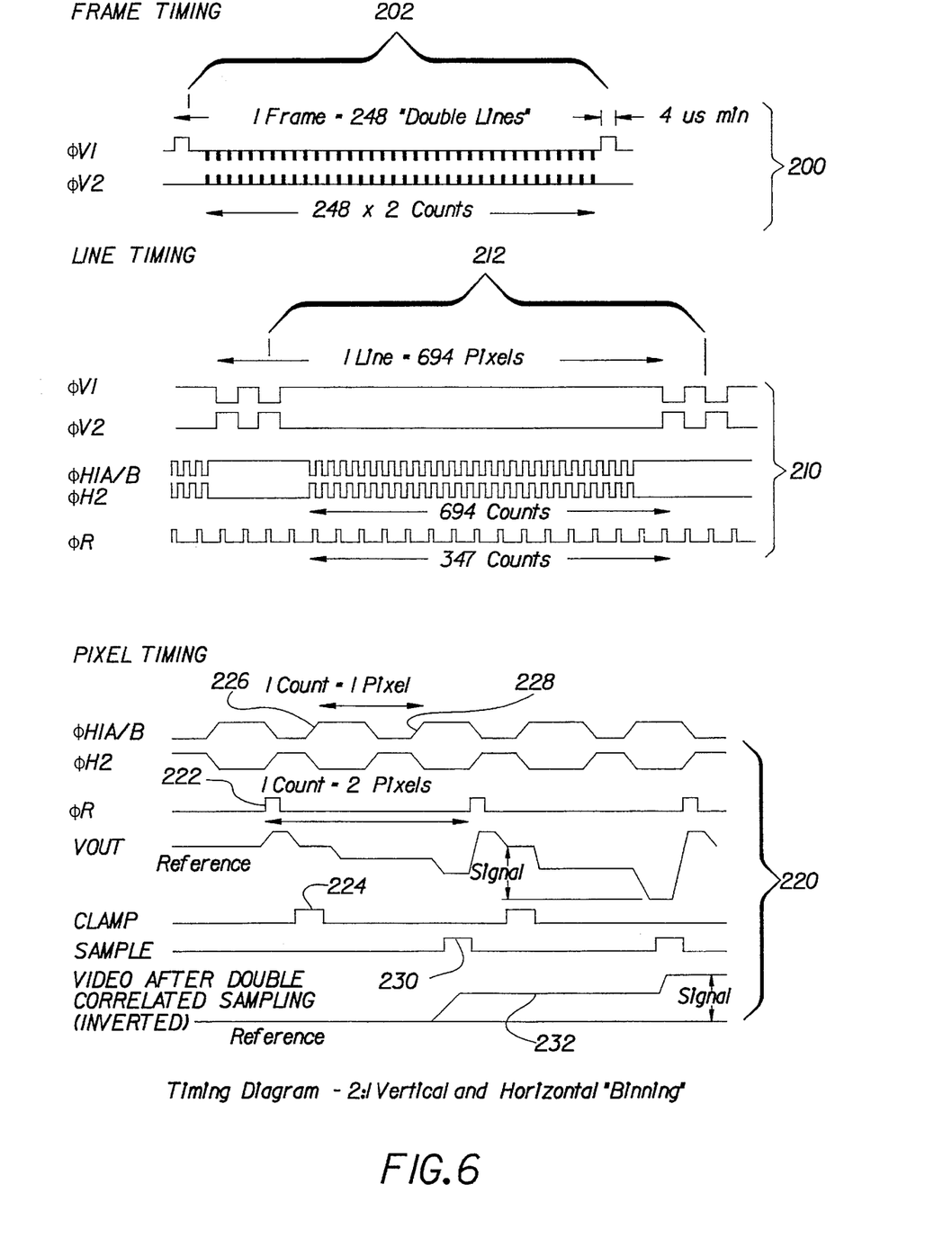
FIG. 6 shows timing waveforms for 2×2 binning operation of the sensor shown in FIG. 4.

The clock and bias circuit 38 of the sensor 34 is clocked by a timing circuit 40, which is capable of clocking out all of the pixels of the sensor, or binning (summing) together the pixels into a lower resolution image, for example one with 242 lines and 324 pixels per line. FIGS. 5 and 6 provide the timing diagrams for the normal and the 2×2 binning operation, respectively. In the binning operation, the photosite charge is summed first vertically and then horizontally, to create pixel values which include the signal charge from four neighboring photosites. In the normal timing, signal charge is transferred from the photosites 35 to the vertical readout registers 37 during transfer pulse times 102 of frame timing 100. Lines are transferred one by one into the horizontal register 36, utilizing the line timing waveforms 110 shown in FIG. 5, and pixels are transferred out of the register 36, utilizing the pixel timing waveforms 120 shown in FIG. 5.

To sum or "bin" the charge vertically, two lines are transferred into the horizontal readout register 36a by cycling V1 and V2 high and low twice per line, as shown in the waveform portion 212 of the "line timing" portion 210 of FIG. 6, rather than once per line, as shown in the waveform portion 112 of the "line timing" portion 110 of FIG. 5. To sum or "bin" the charge horizontally, the floating diffusion output is reset after every second pixel is read out, so that the charge from two horizontal pixels is summed on the output diffusion of an output amplifier 50 on the image sensor 34 (see FIG. 4). Since each of these two horizontal pixels contains the charge from two vertically adjacent lines, the output signal level is nominally four times the signal level for the "normal" (no binning) operation, using the timing waveforms shown in FIG. 5.

Figure 10:
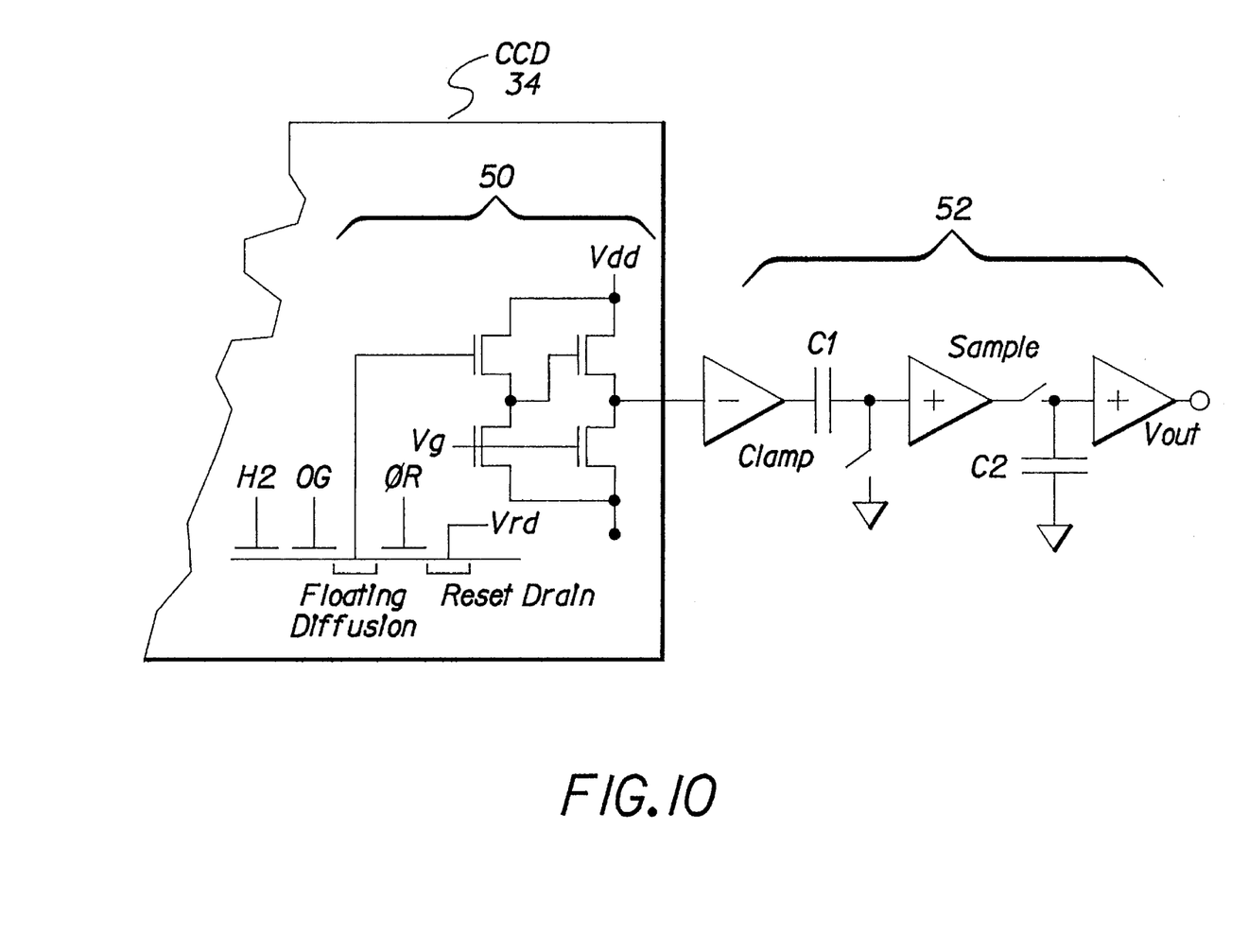
FIG. 10 shows a correlated double sampling circuit used in camera head of FIG. 3.

With respect to pixel timing for "binning" the charge horizontally, as shown in the "pixel timing" portion 220 of FIG. 6, the output sequence is to first reset the floating diffusion output by cycling $\Phi R$ high and low at time 222, which sets the output diffusion of the output amplifier 50 to a nominal voltage controlled by the reset drain voltage VRD. The next step is to clamp to this reset level by cycling the CLAMP signal controlling a correlated double sampling circuit 52 (shown in FIG. 10) high and low at time 224. The charge from the two adjacent horizontal pixels is transferred onto the floating diffusion output on the rising edge of $\Phi H1$, at times 226 and 228 respectively. After the second horizontal pixel charge is transferred to the output diffusion, the voltage of the output diffusion is sampled with the SAMPLE signal at time 230. This sampled value 232 is equal to the "binned" sum of 2 vertical and 2 horizontal pixels.

The timing circuit 40 also controls the light emitting devices 26a, 26b, 26c via the LED control device 28, and provides sync signals to the digital data link 24. The output of the output amplifier 50 on the image sensor 34 is processed by the correlated double sampling (CDS) circuit 52, shown also in FIG. 10, and an analog/digital (A/D) converter 54. The A/D output is provided to an exposure level determination circuit 42 and is also sent over the digital data link 24 to the base unit 22. In the base unit 22, the color sequential digital image frames are stored in separate luminance (Y), red (R) and blue (B) frame stores 56, 58, 60. Since the R and B frames have only ½ as many lines and ½ as many pixels as the Y frame, smaller digital memories can be used to store these frames. The last Y, R, and B frames received from the camera head 20 are used to create a normal NTSC scanning format (525 total lines, 60 field/sec) color image. This is accomplished by forming luminance (Y) and color difference (R-Y and B-Y) signals in subtractors 62 and 64 by subtracting a 2×2 pixel average of the Y stored image generated by the averaging circuit 66 from the R and B images. These signals can be combined (in a subsequent circuit, not shown) to form a composite NTSC or an S-Video signal, or matrixed to form an RGB component NTSC image. Such processing is conventional, and well known in the art.

The exposure determination circuit 42 in FIG. 3 operates in conjunction with the timing circuit 40 and the LED control device 28 to provide the proper exposure. In an endoscope application, the light level reflected from objects depends on the distance between the object and the light sources 26a, 26b, 26c in the camera head 20. The illumination level decreases dramatically as the distance between the light sources and the object increases. Therefore, the sensor exposure should be controlled, in order to provide acceptable images over the range of distances expected to be encountered. The exposure level determination circuit 42 determines the exposure level of a particular frame by calculating, for example, the average digital code level of the pixels of that frame. Alternately, the peak code level can be measured. The circuit then compares the level with a reference level, to determine whether the average or peak signal level is within a range of acceptable levels. If the level is outside the desired range, the exposure level is adjusted during the next capture of the same type (i.e., luminance, red, or blue) of frame.

Figure 11A:
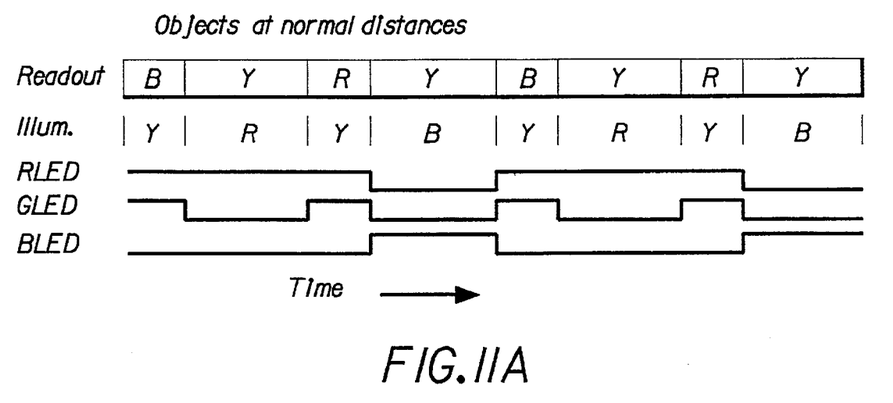
FIGS. 11A, B and C show readout and illumination waveforms for different levels of exposure.

FIG. 11A shows the readout sequence of image sensor 34, and the signals for controlling the red 26a, green 26b, and blue 26c LEDs for objects at normal distances. The R LED, G LED, and B LED signals are high when the respective LEDs are turned on, and low when the LEDs are turned off. Note that the readout color sequence lags the illumination color sequence by one frame period. For example, the red frame exposure is completed by turning on the red LED 26a, while a luminance frame is read out of the sensor. Next, the red frame is read out, while both the red and green LEDs 26a, 26b are turned on, to provide a luminance frame exposure. Next, the luminance frame is read out, while the blue LED 26c is turned on, to provide a blue frame exposure, and so on. Note also that the readout time for the luminance frames is approximately twice as long as for the red or blue frames. This happens because 2×2 "binning" is used to read out the red and blue signals. Because 2 lines are summed in the horizontal readout register 36a, as shown in time interval 212 of FIG. 6, there are only 248 horizontal line readout periods using the 2×2 binning, as shown in frame timing waveforms 200. In the normal readout mode used to read out the luminance frame, there are 496 line readout periods, as shown in frame timing waveforms 100.

Figure 11B:
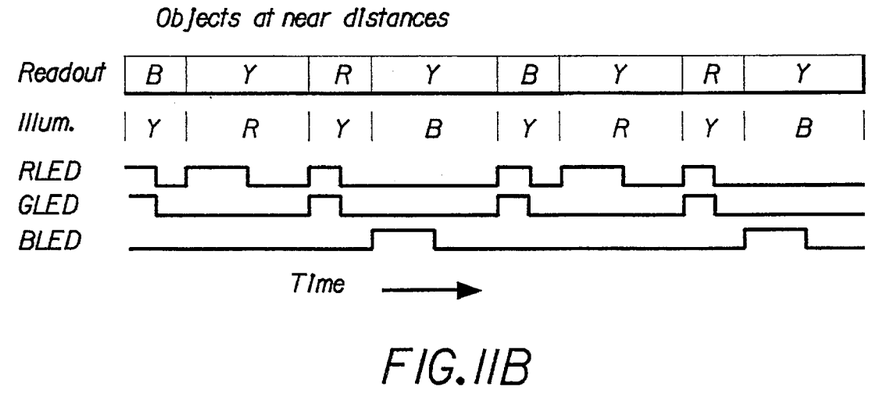

In FIG. 11A, the illumination period is equal to the readout period. This provides proper exposure for objects at normal distances. However, for near objects, the amount of light reflected from the object is large, if the illumination period equals the readout period. Therefore, the illumination period is decreased, as shown in FIG. 11B. In FIG. 11B, the LEDs are illuminated for only a portion of the sensor readout period. This has the further advantage of decreasing the power consumption of the camera head.

Figure 11C:
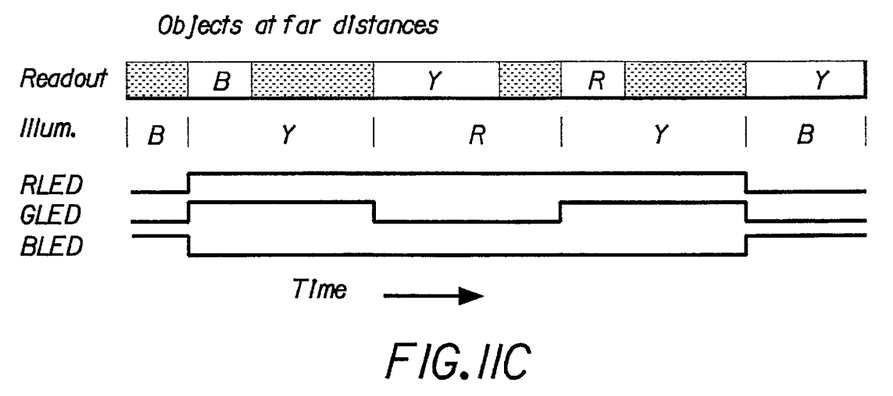

Objects at far distances reflect very little light, since the illumination level is inversely proportional to the square of the distance between the light source and the object. In some prior art systems, electrical gain is used to amplify the signal level in such conditions. However, this also amplifies any sensor noise, so that the result is a noisy image. In other prior art systems, the illumination level is increased by increasing the current to the illumination source. Unfortunately, this greatly increases the power consumption and the temperature of the camera head. The present invention increases the sensor exposure for distant objects by decreasing the frame rate. This provides a longer exposure time for each frame, as shown in FIG. 11C. Note that each frame illumination period is now twice as long as shown in FIG. 11A. Therefore, the signal levels from the sensor are increased by a factor of two. This is accomplished by providing a "dormant" period between each frame readout, during which the appropriate LEDs are illuminated. The "dormant" period causes a decrease in the frame rate, but this causes little image degradation since the relative motion of far objects is much less than for near objects. The increased exposure level results in a noticeable increase in quality, because of the improved image signal-to-noise ratio.

For far objects which provide extremely low light levels, the signal levels can be further increased by using 2×2 "binning" of the luminance frames, and 4×4 "binning" of the red and blue frames. This provides an additional ×4 increase in the signal level, although it decreases the amount of image detail. The overall quality of the image is improved, because the reduction in noise is much more noticeable than the reduction in image sharpness. In addition to adjusting the LED illumination periods, frame rate, and the amount of binning, the exposure level determination circuit 42, can adjust the electrical gain of the amplifiers in the CDS circuit 52, as is commonly done in the prior art.

Figure 7:
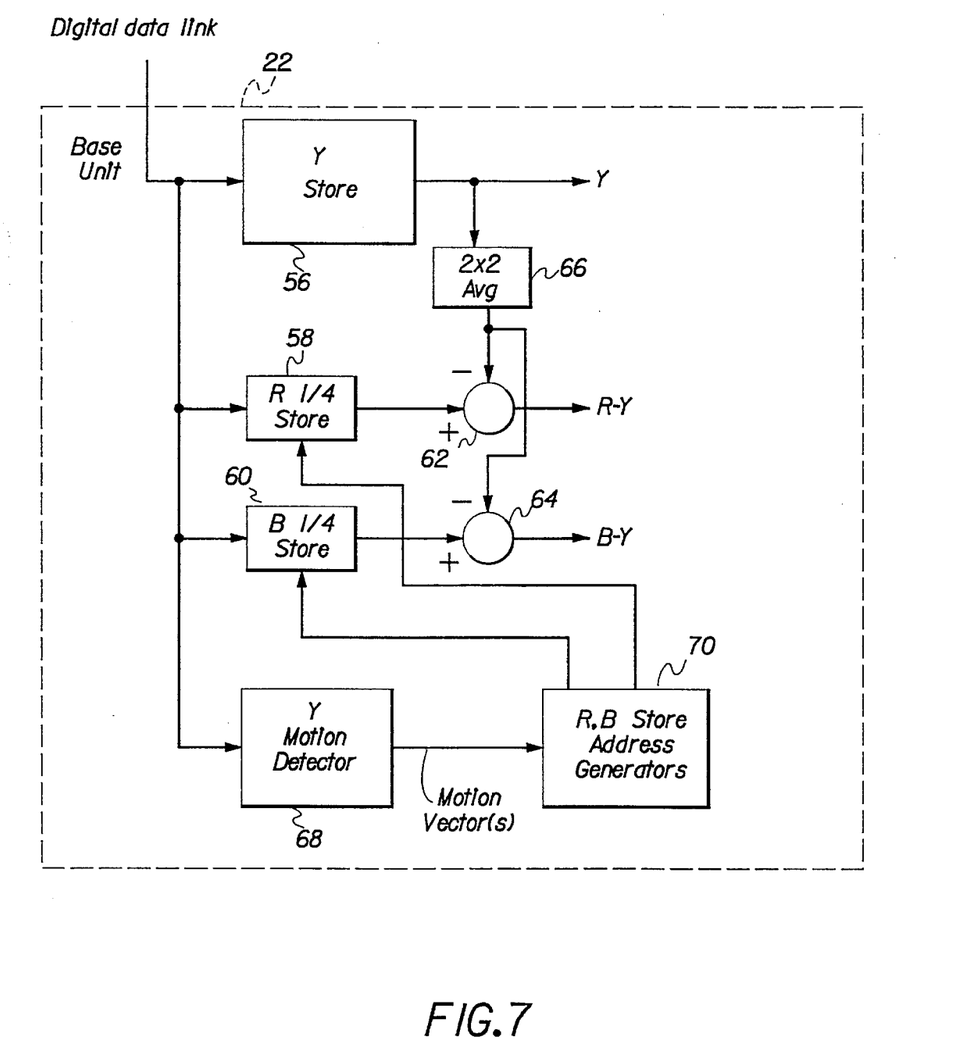
FIG. 7 shows a second embodiment of the invention having a base unit using the luminance motion vector to shift the stored chrominance components.

FIG. 7 shows a second embodiment of a base unit 22 which includes a Y motion detector 68 to detect the amount of luminance motion from one frame to the next. The Y motion detector 68 could determine the average motion of the entire luminance frame (for example due to camera shake) or the motions of small blocks (for example 16×16 pixel blocks) within the luminance frame, and generate luminance motion vector(s). The luminance motion vector(s) are used to adjust the timing of address generators 70 used to read out the R and B stored data, so as to shift these image planes properly in the same direction as the luminance motion.

An applicable method for determining motion vectors is described in U.S. patent application 08/118,897, entitled "Method for processing color image records subject to misregistration", filed Sep. 9, 1993, in the name of Hintz et al. and assigned to Eastman Kodak Company. Hintz shows a method for correlating two subsections of an image, one subsection from a red image record and the second subsection from a green image record. The result of the correlation process performed on the two subsections provides an integer pixel shift value, which indicates the horizontal and vertical misregistration between the two image planes. This same method can be used to calculate the motion vector between two luminance images taken at two different periods of time. In this case, the result of the correlation process performed on the two luminance frames provides a pixel shift value, which indicates the horizontal and vertical motion between the two luminance images. This pixel shift value is a "motion vector", which indicates the magnitude and direction of the image motion that occurred between the two luminance frames. By shifting the red and blue planes in the direction of the motion vector, any color misregistration due to motion occurring between the color sequential red or blue frames and the luminance frames can be reduced.

The magnitude of the shift depends on the relative times at which the red, blue, and luminance frames were captured. For example, if there are 20 luminance frames per second, and 10 frames each for red and blue, then for the luminance frame which immediately follows a red frame, the red record should be shifted by ½ times the magnitude of the luminance motion vector, and the blue record should be shifted by 3⁄2 times the magnitude of the luminance motion vector.

If the motion is substantially uniform for the entire image, as would be the case if the motion was caused by camera motion, a single motion vector could correct the entire image. This is typically the case for medical endoscope applications. If, however, the motion is substantially different in different parts of the image, different motion vectors can be computed in different subsections of the image, and used to "warp" the stored red and blue frames to reduce color misregistration errors. U.S. patent application 07/712,865 "Cross correlation image sensor alignment system", filed Jun. 10, 1991 in the name of Parker, et al., and assigned to Eastman Kodak Company, describes a misregistration correction circuit that can shift different parts of an image by different amounts, using in this case the location motion vectors as the correction signal inputs.

Many other motion estimation methods can be used. Possible methods are described in an article by J. K. Aggarwal and N. Nandhakumar, entitled "On the computation of motion from sequences of images" which appeared in the Proceedings of the IEEE, volume 76, on pages 917–935 in August 1988, and in an article entitled "Review of motion analysis techniques", which appeared in the Proceedings of the IEEE, volume 136, part 1, on pages 397–404 in December 1989.

Figure 8:
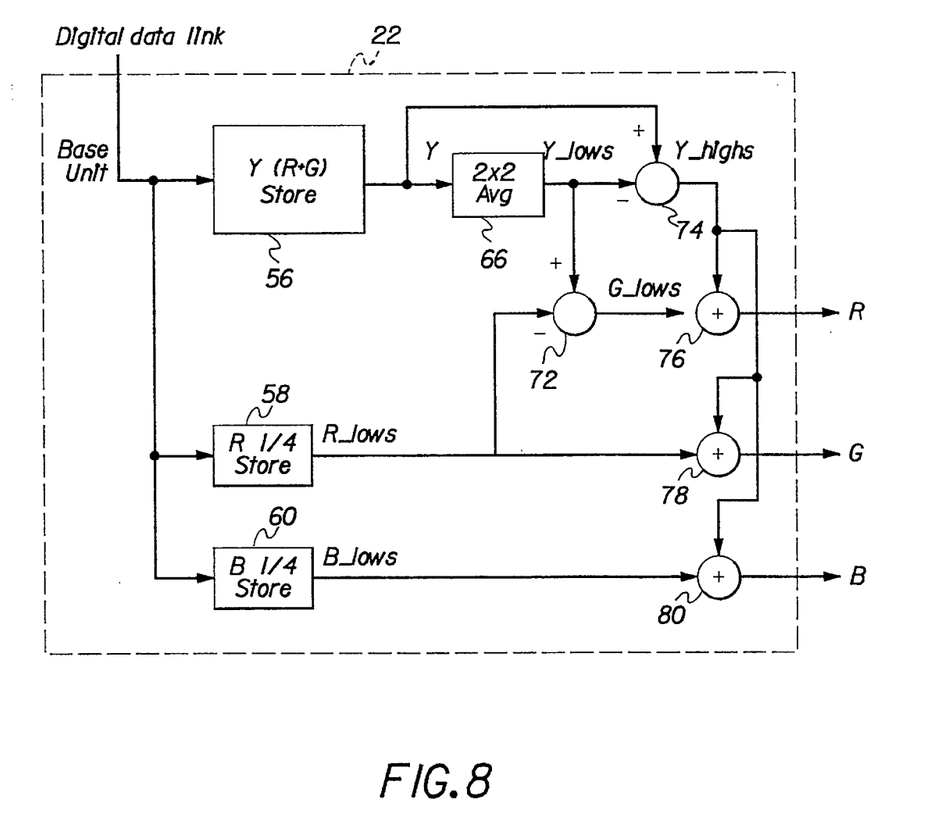
FIG. 8 shows a third embodiment of the invention having a base unit with simple processing to provide RGB output signals.

FIG. 8 shows a third embodiment of the base unit 22 with simple processing to provide RGB output signals. The luminance store 56 output (R+G, from turning on both the red and green LEDs) is averaged in groups of 2×2 pixels in the averaging circuit 66 to form a Y__lows signal. The R store 58 output is subtracted from Y__lows in a subtractor 72 to form G__lows. The Y__highs signal (luminance detail) is formed by subtracting Y__lows from the stored Y signal in a subtractor 74. This "luminance detail" Y__ highs signal is added in adders 76, 78, 80 to the RGB lows signals to form high resolution RGB signals. The motion detection approach shown in FIG. 7 could be used with this RGB processing as well.

Figure 9:
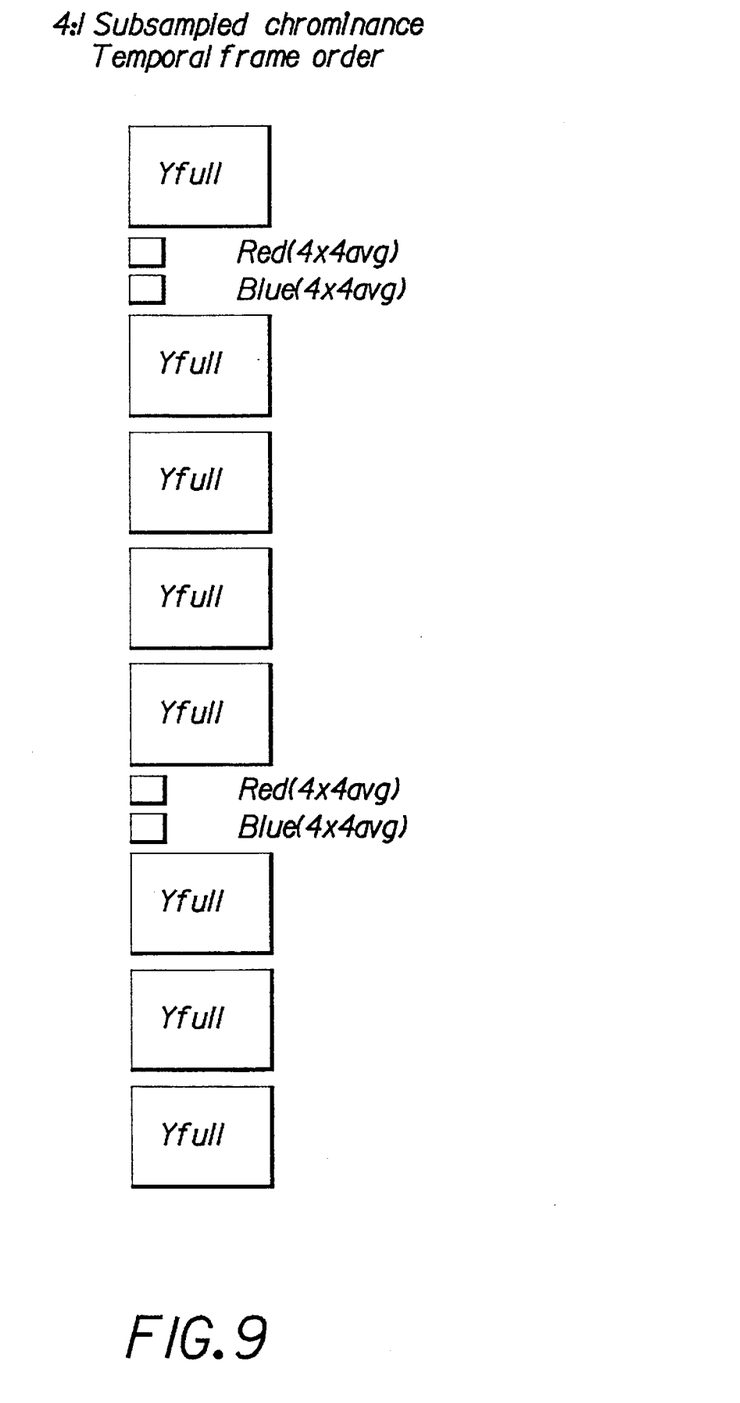
FIG. 9 shows a fourth embodiment of the invention using 4:1 temporal and spatial chrominance subsampling.

FIG. 9 shows a fourth embodiment of the invention using 4:1 temporal and spatial chrominance subsampling. The R and B signals are now binned (averaged) by 4:1 in each direction, to provide a 121×162 pixel image. There are four full resolution Y images for each R or B image, and the R and B images are temporally adjacent.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

PARTS LIST

20 CAMERA HEAD
22 BASE UNIT
24 DIGITAL DATA LINK
26a RED LIGHT EMITTING DEVICE
26b GREEN LIGHT EMITTING DEVICE
26c BLUE LIGHT EMITTING DEVICE
28 LED CONTROL DEVICE
30 SUBJECT
32 LENS
34 IMAGE SENSOR
35 PHOTODIODES
36a READ OUT REGISTERS
36b READ OUT REGISTERS
37 VERTICAL READOUT REGISTERS
38 CLOCK AND BIAS CIRCUIT
40 TIMING CIRCUIT
42 EXPOSURE LEVEL DETERMINATION CIRCUIT
50 OUTPUT AMPLIFIER
52 CDS CIRCUIT
54 A/D CONVERTER
56 Y FRAME STORE
58 R FRAME STORE
60 B FRAME STORE
62 SUBTRACTOR
64 SUBTRACTOR

66 AVERAGING CIRCUIT
68 Y MOTION DETECTOR
70 ADDRESS GENERATORS
72 SUBTRACTOR
74 SUBTRACTOR
76 ADDER
78 ADDER
80 ADDER
100 FRAME TIMING
102 TRANSFER PULSE TIMES
110 LINE TIMING PORTION
112 WAVEFORM PORTION
120 PIXEL TIMING WAVEFORM
200 FRAME TIMING WAVEFORM
202 TRANSFER PULSE TIMES
210 LINE TIMING PORTION
212 WAVEFORM PORTION
220 PIXEL TIMING PORTION
222 TIME
224 TIME
226 TIME
228 TIME
230 TIME
232 SAMPLED VALUE

What is claimed is:

1. An electronic color sequential camera, comprising:
a plurality of light sources arranged to sequentially illuminate a subject;
means for activating a) two or more of said light sources within the same time to generate a luminance light beam and b) selected ones of said light sources independently to generate at least first and second chrominance light beams, the luminance and chrominance light beams being generated in a predetermined sequence; and
an image sensor arranged to receive the luminance and chrominance light beams reflected from the subject and to generate therefrom a color sequential signal comprising a sequence of luminance and chrominance image components.

2. A camera as claimed in claim 1 wherein said light sources include red, green, and blue light emitting devices, and wherein the luminance light beam is a combination of red and green emissions from said red and green devices and the first and second chrominance light beams are red and blue emissions, respectively, from said red and blue devices.

3. A camera as claimed in claim 2 wherein said luminance light is a weighted combination of the red and green emissions.

4. A camera as claimed in claim 1 further comprising a plurality of memory units coupled to said image sensor for separately storing the luminance and chrominance image components.

5. A camera as claimed in claim 4 wherein said predetermined sequence of light beams includes a sequence of luminance light beams separated by an alternating sequence of either first or second chrominance light beams, and said image sensor generates a color sequential signal comprising a sequence of luminance image components separated by an alternating sequence of chrominance image components, whereby the chrominance image components are captured at a lower temporal rate than the luminance image components.

6. A camera as claimed in claim 4 wherein said image sensor comprises an array of photosites arranged in rows and columns, and said luminance image component is obtained from substantially all the photosites and the chrominance image components are obtained by binning together selected rows and/or columns of photosites to produce a lesser number of pixel values, whereby the chrominance image components are captured at a lower spatial resolution than the luminance image components.

7. A camera as claimed in claim 4 or 5 further comprising means for reading each chrominance image component from said memory unit a plurality of times while spatially shifting the chrominance image components to compensate for motion of the luminance image component.

8. A camera as claimed in claim 1 or 2 wherein a correct exposure level for the subject is obtained by varying an illumination period of at least one of said luminance and chrominance light beams.

9. A camera as claimed in claim 8 wherein the luminance and chrominance image components represent frames read out from said image sensor, and the correct exposure level for the subject is obtained by further varying a frame readout period of the sensor.

10. An electronic color sequential camera, comprising:
a plurality of light sources arranged to sequentially illuminate a subject;
means for activating said light sources to generate a luminance light beam and at least first and second chrominance light beams, the luminance and chrominance light beams being generated in a predetermined sequence of luminance light beams separated by an alternating sequence of either first or second chrominance light beams; and
an image sensor arranged to receive the luminance and chrominance light beams reflected from the subject and to generate therefrom a color sequential signal comprising a sequence of luminance image components separated by an alternating sequence of chrominance image components, whereby the chrominance image components are captured at a lower temporal rate than the luminance image components.

11. A camera as claimed in claim 10 wherein said light sources include red, green, and blue light emitting devices, and wherein the luminance light beam is a combination of red and green emissions from said red and green devices and the first and second chrominance light beams are red and blue emissions, respectively, from said red and blue devices.

12. A camera as claimed in claim 11 wherein said luminance light is a weighted combination of the red and green emissions.

13. A camera as claimed in claim 10 further comprising a plurality of memory units coupled to said image sensor for separately storing the luminance and chrominance image components.

14. A camera as claimed in claim 10 wherein said image sensor comprises an array of photosites arranged in rows and columns, and said luminance image component is obtained from substantially all the photosites and the chrominance image components are obtained by binning together selected rows and/or columns of photosites to produce a lesser number of pixel values, whereby the chrominance image components are captured at a lower spatial resolution than the luminance image components.

15. A camera as claimed in claim 10 or 14 further comprising means for reading each chrominance image component from said memory unit a plurality of times while spatially shifting the chrominance image components to compensate for motion of the luminance image component.

16. A camera as claimed in claim 10 or 11 wherein a correct exposure level for the subject is obtained by varying an illumination period of at least one of said luminance and chrominance light beams.

17. A camera as claimed in claim 16 wherein the luminance and chrominance image components represent frames read out from said image sensor, and the correct exposure level for the subject is obtained by further varying a frame readout period of the sensor.

18. An electronic color sequential camera, comprising:
a plurality of light sources arranged to sequentially illuminate a subject;
means for activating at least two of said light sources within the same time to generate a luminance light beam and selected ones of said light sources independently to generate at least first and second chrominance light beams, the luminance and chrominance light beams being generated in a predetermined sequence; and
an image sensor arranged to receive the luminance and chrominance light beams reflected from the subject and to generate therefrom a color sequential signal comprising a sequence of luminance and chrominance image components, said image sensor comprising an array of photosites arranged in rows and columns from which said luminance image component is obtained from substantially all the photosites and the chrominance image components are obtained by binning together selected rows and/or columns of photosites to produce a lesser number of pixel values, whereby the chrominance image components are captured at a lower spatial resolution than the luminance image components.

19. A camera as claimed in claim 18 wherein said light sources include red, green, and blue light emitting devices, and wherein the luminance light beam is a combination of red and green emissions from said red and green devices and the first and second chrominance light beams are red and blue emissions, respectively, from said red and blue devices.

20. A camera as claimed in claim 18 wherein said luminance light is a weighted combination of the red and green emissions.

21. A camera as claimed in claim 18 further comprising a plurality of memory units coupled to said image sensor for separately storing the luminance and chrominance image components.

22. A camera as claimed in claim 18 wherein said predetermined sequence of light beams includes a sequence of luminance light beams separated by an alternating sequence of either first or second chrominance light beams, and said image sensor generates a color sequential signal comprising a sequence of luminance image components separated by an alternating sequence of chrominance image components, whereby the chrominance image components are captured at a lower temporal rate than the luminance image components.

23. A camera as claimed in claim 21 further comprising means for reading each chrominance image component from said memory unit a plurality of times while spatially shifting the chrominance image components to compensate for motion of the luminance image component.

24. A camera as claimed in claim 18 or 19 wherein a correct exposure level for the subject is obtained by varying an illumination period of at least one of said luminance and chrominance light beams.

25. A camera as claimed in claim 24 wherein the luminance and chrominance image components represent frames read out from said image sensor, and the correct exposure level for the subject is obtained by further varying a frame readout period of the sensor.

26. A color sequential video camera, comprising:
a plurality of light sources arranged to sequentially illuminate a subject;
means for activating a) two or more of said light sources within the same time to generate a luminance light beam and b) selected ones of said light sources independently to generate at least first and second chrominance light beams, the luminance and chrominance light beams being generated in a predetermined sequence;
an image sensor arranged to receive the luminance and chrominance light beams reflected from the subject and to generate therefrom a sequence of luminance and chrominance image signals; and
a plurality of memory units coupled to said image sensor for separately storing the luminance and chrominance image signals.

27. A camera as claimed in claim 26 wherein said predetermined sequence of light beams includes a sequence of luminance light beams separated by an alternating sequence of either first or second chrominance light beams, whereby said image sensor generates a sequence of luminance signals derived from the luminance beams separated by an alternating sequence of chrominance image signals derived from either the first or second chrominance beams.

28. A camera as claimed in claim 26 wherein said image sensor is an array of photosites arranged in rows and columns, and wherein said luminance signal is obtained from substantially all the photosites and the chrominance image signals are obtained by binning together selected rows and/or columns of photosites to produce a lesser number of pixel values.

29. A color sequential video imaging system, comprising:
a plurality of differently-colored light sources for illuminating a subject;
an optical section for collecting light from said sources reflected from the subject;
a solid state image sensor positioned for receiving the reflected light collected by said optical section; and
a timing section for driving two or more of said light sources within the same time to provide luminance-weighted light and for independently driving selected ones of said light sources to provide at least first and second chrominance-weighted lights, said timing section further driving said image sensor to provide a luminance image signal and first and second chrominance image signals in correspondence to the incidence of luminance and chrominance light upon said sensor.

30. A color sequential video imaging system, comprising:
a plurality of light sources for sequentially illuminating a subject with a plurality of differently-colored light beams;
an optical section for collecting light reflected from the subject;
a solid state image sensor positioned for receiving the reflected light collected by said optical section and for generating a sequence of image signals; and
a timing section for driving two or more of said light sources within the same time to provide a luminance-weighted light beam and for independently driving selected ones of said light sources to provide at least first and second chrominance-weighted light beams, said timing section further driving said image sensor to provide a luminance image signal and first and second chrominance image signals in correspondence to the incidence of the luminance and chrominance light beams upon said sensor.

31. A color sequential video camera, comprising:

a plurality of light sources arranged to sequentially illuminate a subject;

an image sensor arranged to receive light reflected from the subject and to generate therefrom a sequence of image signals; and means for sequentially energizing a) two or more of said light sources within the same time to generate a luminance-weighted beam of light, and b) selected ones of said light sources independently to generate at least first and second chrominance beams of light, whereby said image sensor correspondingly generates a sequence of luminance and chrominance image signals.

32. A camera as claimed in claim 31 wherein said sequentially energizing means generates a sequence of luminance-weighted beams of light separated by an alternating sequence of either first or second chrominance beams of light, whereby said image sensor generates a sequence of luminance signals separated by an alternating sequence of chrominance image signals derived from either the first or second chrominance beams of light.

33. A camera as claimed in claim 32 wherein said light sources are red, green, and blue light sources, and wherein said sequentially energizing means generates the luminance-weighted beam from a combination of at least red and green beams and the chrominance beams from red or blue beams.

34. An electronic color sequential camera, comprising:

a plurality of color light sources arranged to sequentially illuminate a subject;

means for activating said light sources to generate a plurality of light beams in a predetermined sequence;

an image sensor arranged to receive the light beams reflected from the subject and to generate therefrom a color sequential signal comprising a sequence of image frame components;

an exposure level determination section for determining an illumination level of the light beams reflected from the subject; and a timing section for reading out the image frame components from said image sensor during a predetermined readout period according to a predetermined frame rate for normal illumination levels, wherein said timing section reduces the frame rate responsive to said exposure level determination section for low illumination levels such that, for low illumination levels, the period during which the light sources are illuminating the sensor is made longer than the readout period.

35. A camera as claimed in claim 34 wherein said light sources include red, green, and blue light emitting devices, and wherein a luminance light beam is generated from a combination of red and green emissions from said red and green devices and first and second chrominance light beams are generated from red and blue emissions, respectively, from said red and blue devices.

36. A camera as claimed in claim 35 wherein said luminance light is a weighted combination of the red and green emissions.

37. A camera as claimed in claim 35 further comprising a plurality of memory units coupled to said image sensor for separately storing the luminance and chrominance image components.

38. A camera as claimed in claim 37 wherein said predetermined sequence of light beams includes a sequence of luminance light beams separated by an alternating sequence of either first or second chrominance light beams, and said image sensor generates a color sequential signal comprising a sequence of luminance image components separated by an alternating sequence of chrominance image components, whereby the chrominance image components are captured at a lower temporal rate than the luminance image components.

39. A camera as claimed in claim 38 wherein said image sensor comprises an array of photosites arranged in rows and columns, and said luminance image component is obtained from substantially all the photosites and the chrominance image components are obtained by binning together selected rows and/or columns of photosites to produce a lesser number of pixel values, whereby the chrominance image components are captured at a lower spatial resolution than the luminance image components.

40. A camera as claimed in claim 37 or 38 further comprising means for reading each chrominance image component from said memory unit a plurality of times while spatially shifting the chrominance image components to compensate for motion of the luminance image component.

41. An electronic color camera comprising:

an image sensor arranged to receive light reflected from a subject and to generate therefrom a color signal comprising color components;

an exposure level determination section for determining an illumination level of the light reflected from the subject; and a timing section for reading out the signal comprising color components from said image sensor during a predetermined readout period according to a predetermined frame rate for normal illumination levels, wherein said timing section reduces the frame rate responsive to said exposure level determination section for low illumination levels such that, for low illumination levels, the period during which the light is illuminating the sensor is made longer than the readout period.

* * * * *